United States Patent
Moreau et al.

(10) Patent No.: US 7,145,994 B2
(45) Date of Patent: Dec. 5, 2006

(54) METHOD FOR FLEXIBLE CHARGING OF IP MULTIMEDIA COMMUNICATION SESSIONS, TELECOMMUNICATION SYSTEM AND NETWORK ELEMENTS FOR APPLYING SUCH A METHOD

(75) Inventors: André Marcel Moreau, Kapellen (BE); Lieve Maria Marcella Rosemarijn Bos, Vlimmeren (BE)

(73) Assignee: Alcatel, Paris (FR)

( * ) Notice: Subject to any disclaimer, the term of this patent is extended or adjusted under 35 U.S.C. 154(b) by 579 days.

(21) Appl. No.: 10/294,582

(22) Filed: Nov. 15, 2002

(65) Prior Publication Data

US 2003/0096592 A1 May 22, 2003

(30) Foreign Application Priority Data

Nov. 21, 2001 (EP) ................................. 01402986

(51) Int. Cl.
*H04M 15/00* (2006.01)
*H04M 11/00* (2006.01)

(52) U.S. Cl. ........................ 379/114.01; 379/114.03; 379/115.01; 379/126; 455/406

(58) Field of Classification Search ............... 379/111, 379/112.01, 114.01, 114.02, 114.1, 114.14, 379/115.01, 115.02, 118, 120, 121.04, 121.05, 379/121.06, 126, 127.01, 127.02, 133–134, 379/114.03, 114.06; 455/405, 406, 408; 370/395.5, 395.52, 493–495

See application file for complete search history.

(56) References Cited

U.S. PATENT DOCUMENTS

| | | | |
|---|---|---|---|
| 6,157,917 A | | 12/2000 | Barber |
| 6,891,938 B1 * | | 5/2005 | Scott et al. ............ 379/112.06 |
| 6,910,074 B1 * | | 6/2005 | Amin et al. .............. 709/227 |
| 2002/0068545 A1 * | | 6/2002 | Oyama et al. ............ 455/406 |
| 2002/0119766 A1 * | | 8/2002 | Bianconi et al. .......... 455/406 |

FOREIGN PATENT DOCUMENTS

| EP | 1 134 951 A2 | 9/2001 |
|---|---|---|
| WO | WO 00/79756 A2 | 12/2000 |
| WO | WO 01/35294 A1 | 5/2001 |

OTHER PUBLICATIONS

3rd Generation Partnership Project, Technical Specification Group Services and System Aspects, 3GPP TS 23.228 v5.2.0 IP Multimedia Subsystem (IMS) Stage 2 (Release 5), Oct. 2001, pp. 1-123.

(Continued)

*Primary Examiner*—Quoc Tran
(74) *Attorney, Agent, or Firm*—Sughrue Mion, PLLC

(57) ABSTRACT

A method for charging Internet protocol multimedia communication sessions within a telecommunication system is disclosed. Charging records are generated by a control element in the system with a same correlation identifier for all the charging records produced for a communication session between parties. A multi-sided correlation identifier and a charging information field containing information related to a determined charging plan is passed via session control protocol between control elements. The charging plan information, along with the multi-sided correlation identifier, is propagated between control elements in the system. The multi-sided correlation identifier and selected charging data is included in each charging record generated for the communication session by each control element. The charge for the communication session is calculated on the basis of the selected charging data received by via the charging records including the multi-sided correlation identifier.

12 Claims, 2 Drawing Sheets

OTHER PUBLICATIONS

3rd Generation Partnership Project, Technical Specification Group Services and Systems Aspects, 3G TS 23.002 v5.1.0, "Network Architecture (Release 5)", Dec. 2000, pp. 1-46.

ETSI TS 123.060 v4.2.0 Digital Cellular Telecommunications System (Phase 2+) (GSM), Universal Mobile Telecommunications System (UMTS), "General Packet Radio Service (GPRS) Service Description Stage 2" (3GPP TS 23.060 version 4.2.0 Release 4), Oct. 2001, pp. 1-198.

3rd Generation Partnership Project, Technical Specification Group Services and System Aspects, 3GPP TR 23.815 v0.1.0, "Charging Implications of IMS Architecture (Release 5)" Oct. 2001, pp. 1-13.

3rd Generation Partnership Project, Technical Specification Group Services and System Aspects, 3GPP TS 32.015 v3.6.0, Telecommunications Management, "Charging and Billing; 3 G call and event data for the Packet Switched (PS) domain (Release 1999)", Jun. 2001, pp. 1-65.

IETF RFC 2543 "SIP: Session Initiation Protocol", Mar. 1999, pp. 1-127.

IETF RFC 2327 "SDP: Session Description Protocol" Apr. 1998, pp. 1-35.

* cited by examiner

METHOD FOR FLEXIBLE CHARGING OF IP MULTIMEDIA COMMUNICATION SESSIONS, TELECOMMUNICATION SYSTEM AND NETWORK ELEMENTS FOR APPLYING SUCH A METHOD

BACKGROUND OF THE INVENTION

The invention relates to a method for flexible charging of Internet protocol multimedia communication sessions in a network, or a framework of networks, of a multimedia telecommunication system by means of which subscribers communicate and get access to services. It also relates to a telecommunication system including a network or a framework of interlinked and interworking networks sharing common rules and a charging arrangement using control elements including means for generation of charging records related to IP multimedia communication sessions in which these control elements are involved, and to network elements for a telecommunication system comprising a network of interlinked and interworking networks sharing common rules and a charging arrangement using control elements fitted out with means for generation of charging records related to IP multimedia communication sessions.

Use of network resources and services by subscribers in a multimedia telecommunication system, with, for instance, a universal mobile telecommunication system (UMTS) or a non-UMTS next generation network (NGN), will have usually to be accounted, charged and/or billed. This commonly implies the use of charging records (CRs) provided for by means of network entities, or elements, that are directly or indirectly involved in the communication sessions.

It is pointed out here that, even if the known UMTS terminology is used in this application in order to facilitate the understanding of the invention, it must be understood that other systems are also concerned by this invention and particularly the said next generation NGN systems that are now developed. In the same way, reference is made to the known session initiation protocol SIP in the application, but the invention is also relevant to other protocol suites, such as H.323 or BICC used in non-UMTS type of NGN networks.

As known, users in a telecommunication system may be charged for use of resources in different network levels, for instance transport level, service level, content level or else. Charging involves functions that are able to format information related to a chargeable event and transfer it to a charging server to allow a usage determination for which a charged party can be billed. Usually, the billed party is the calling party or a called party admitting such a billing. Pre-paid and post paid-billing are available, they are based on arrangements between subscribers and operators or service providers and they can be based on both on-line and off-line mechanisms. A full control is obtainable when an on-line charging mechanism is used for pre-paid payments.

Charging records CRs, as used in charging mechanisms, can be generated at different network levels according to the needs. Different functions and/or control elements generate different bits of information. For instance, at the service/content level, application servers will generate CRs containing data that relate to what services and contents the application is providing. These CRs can be related to multiple multimedia sessions, if multiple sessions are needed to support an application. At the session level, session control elements will generate CRs containing data related to an IP multimedia session that is controlled by these elements. At the transport level, transport control elements generate CRs containing data related to the usage of transport network resources.

So network entities with CRs providing capabilities in known IP multimedia networks include for instance the following network control elements:
session initiation protocol (SIP) servers, such as serving and proxy call state control function protocol (S and P-CSCF) servers,
application (AS) servers, such as SIP application servers or open service architecture application servers (OSA AS),
entities controlling an interface with an external network, such as break out gateway control function (BGCF), topology-hiding inter-network (THIG) gateways or media gateway control function (MGCF) entities,
transport control entities, including UMTS access network elements such as serving GPRS support node (SGSN) or gateway GPRS support node (GGSN),—with GPRS standing for general packet radio service—.

In NGN networks, IP multimedia network control elements have distributed functions to perform and at least some of these distributed functions have to generate charging records with different bits of information.

The different types of charging records that are produced in relation with a communication session at the different network levels have to be correlated at some point, for instance by a network or service provider, as soon as there is a requirement for accurate charging, accounting and/or billing.

According to a known solution, every charging record contains a correlation identifier (ID) and each identifier is a unique number allowing the network and service providers to correlate the different charging records for a communication session between similar network control elements.

The control over the charging plan is usually performed by the home network of the subscriber that initiated the session. There is almost no flexibility for session control elements, outside the home network of the subscriber initiating the session, to change or update the charging plan during a session in known communication systems. A change could, however, be requested by session control elements in other networks, and particularly by SIP servers in networks other than the home network of the subscriber initiating the session. It could also be requested by session control elements inside user terminals and, for instance, from the called party.

With known systems, there is no possibility to make changes to a charging plan down to a media component level, at any time during the session, by any session control element involved in a session, as it could be appropriate. There is also no possibility to communicate a detailed charging scheme to component level, via session signaling, or to ensure correlation between charging in different network levels up to component level.

If, with known systems, there is a possibility for session control elements, such as end-user terminals, to request changes to the session capabilities via SDP negotiation, and for instance a codec and/or bandwidth change or a media component addition or removal, there is no possibility to indicate, at the same time and via SDP negotiation, how charging can be changed for the different session capabilities negotiated via SDP.

SUMMARY OF THE INVENTION

An aspect of the invention is therefore to provide a method and arrangement for a multimedia telecommunication system that allows any session control element involved in the multimedia session, to flexibly change the way a multimedia session is charged at any time during the session, and to communicate this requested charging plan to other session control elements involved in the session by means of a protocol allowing session capability negotiation.

Another aspect of the method and arrangement, according to the invention, is to ensure correlation between different control elements, located in different network levels, when they perform charging activities for a particular session.

Accordingly, the invention proposes a method for charging Internet protocol multimedia communication sessions within a network, or framework of networks, when charging records, related to communication session charging, are generated by at least one control element, with a same correlation identifier for all the charging records produced for a same communication session between at least one calling party and one called party.

According to the invention, the method implies the following steps:

passing, by means of a session control protocol, a correlation identifier together with a charging information field containing information related to a determined charging plan, for a multimedia communication session involving several control elements, from one of these control elements to the others;

propagating charging plan information corresponding to at least a selected set of charging data with the correlation identifier for a multimedia communication session between control elements in a network and/or with control elements of other transport or application network layers involved in the session.

including the correlation identifier and selected charging data in each charging record generated for the communication session by each control element which cooperates to the charging of the communication session, and calculating the charging for the communication session on the basis of the selected charging data received by means of the charging records including the correlation identifier.

According to an embodiment of the invention, the session control protocol, which is used for passing a correlation identifier together with a charging information field, is the SIP/SDP protocol.

According to the invention, the correlation identifier for a communication session is a multi-sided correlation identifier including, at least, an application identifier related to an application involved in the communication session, a session identifier for the communication session and a component identifier related to a control element involved in the communication session.

According to the invention, the charging information field associated with a correlation identifier specifies a charging plan requested by one control element and sent to the other control elements involved in a session when an information corresponding to an event requires it, said charging information field containing a list of sub-elements describing the characteristics of a tariff change to be applied to a session.

According to the invention, a charging information field also contains supplementary characteristics corresponding to choices to be made according to the party to be charged, the session, the media, the component level and/or the data volumes.

The invention also relates to a telecommunication system including a network or a framework of interlinked and interworking networks, sharing common rules, such as UMTS or non-UMTS NGN networks, and a charging arrangement using network control elements including means for generation of charging records related to IP multimedia communication sessions in which these control elements are involved.

According to the invention, the system includes:

means for passing, by means of a session control protocol, a correlation identifier together with a charging information field containing information related to a determined charging plan, for a multimedia communication session involving several control elements, from one of these control elements to the others;

means for propagating charging plan information, with the correlation identifier corresponding to at least a selected set of charging data with the correlation identifier for a multimedia communication session between control elements in a network and/or with control elements of other transport or application network layers, involved in the session;

means for including the correlation identifier and selected charging data in each charging record generated for the communication session by each control element that cooperates to the charging of the communication session, and means for calculating the charging for the communication session on the basis of the selected charging data received by means of the charging records including the correlation identifier.

Moreover, the invention relates to telecommunication network elements for a telecommunication system including a network, or a framework of interlinked and interworking networks sharing common rules, and a charging arrangement using control elements fitted out with means for generation of charging records related to IP multimedia communication sessions, said network also including other multimedia session control elements.

According to the invention, these other multimedia control elements are network elements, each of them including:

means for passing, by means of a session control protocol, a correlation identifier together with a charging information field containing information related to a determined charging plan, for a multimedia communication session involving several control elements, from one of these control elements to the others;

means for propagating charging plan information, with the correlation identifier corresponding to at least a selected set of charging data with the correlation identifier for a multimedia communication session between control elements in a network and/or with control elements of other transport or application network layers, involved in the session, and means for including the correlation identifier and selected charging data in each charging record generated for the communication session by each control element that cooperates to the charging of the communication session.

According to an embodiment of the invention, the said other multimedia control elements are network elements with at least one of them comprising means for calculating the charging for the communication session on the basis of the selected charging data received by means of the charging records including the correlation identifier.

According to another embodiment of the invention, the said other multimedia control elements are network elements are SIP servers and/or SIP user terminals including means for acting as SIP/SDP session control protocol engines, with said network SIP servers including means for charging multimedia communication sessions.

BRIEF DESCRIPTION OF THE DRAWINGS

These and other aspect, advantages and features of the invention will become apparent from the following description thereof taken in conjunction with the accompanying drawings below listed.

DETAILED DESCRIPTION OF THE INVENTION

The method for charging Internet protocol multimedia communication session in a telecommunication system having multimedia capabilities implies the generation of charging records, or CRs, by control elements of the system, which are involved in the sessions. Such control elements provide CRs, when they are involved in a session, i.e., according to the needs for such a session. When post-paid billing is used CRs, as considered here, corresponds to charging data records CDRs, as sent off-line by network control elements to a charging server in known systems, when such control elements are involved in a communication session.

Figure 1:
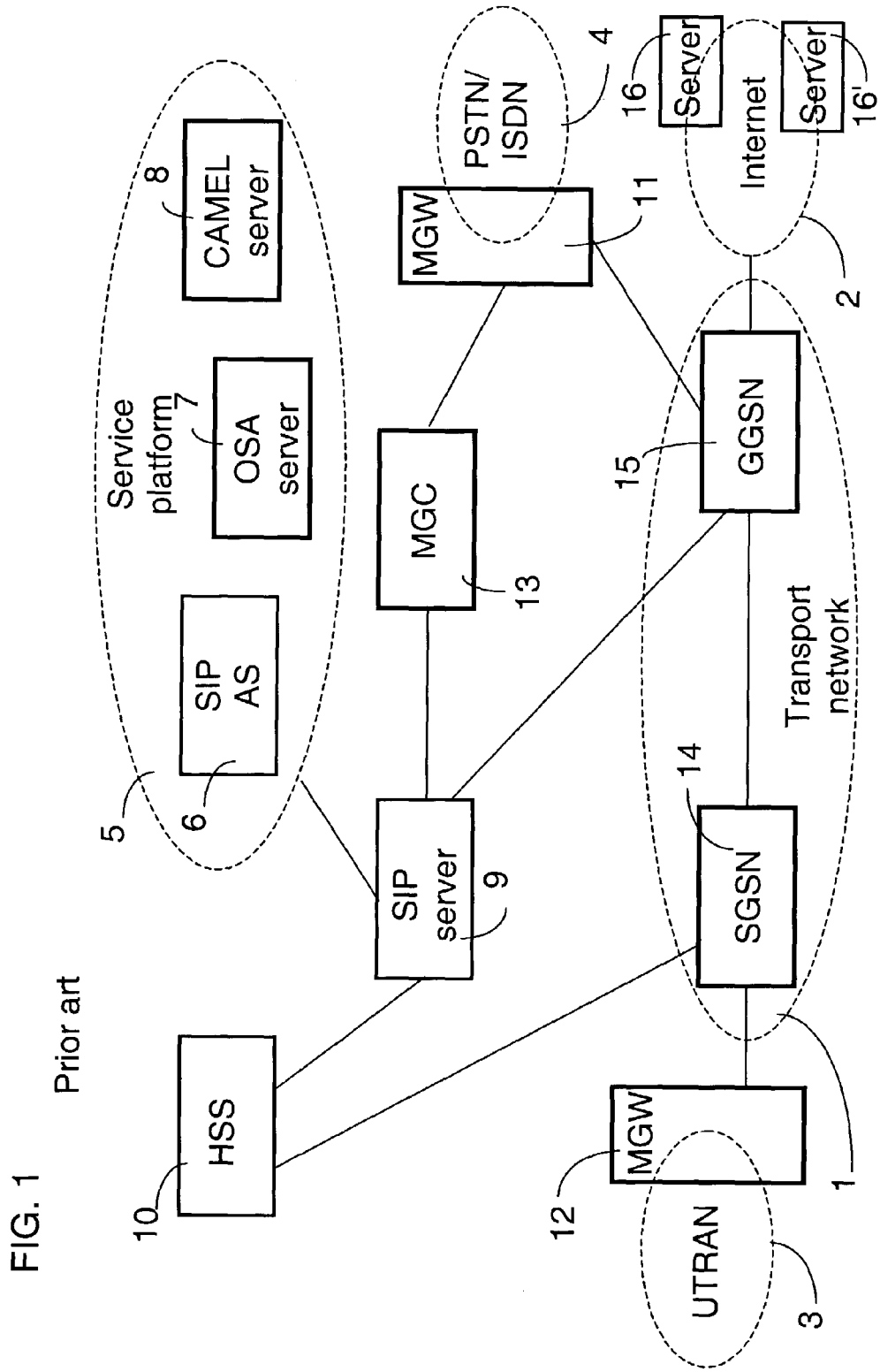
FIG. 1 is a simplified block diagram of a known multimedia telecommunication system provided as a non-limiting example in order to show how the charging method according to the invention is applicable in relation with control elements as found in such a system.

Some control elements with generating CRs capabilities are illustrated on FIG. 1, which corresponds to a non-limiting example of a telecommunication system having a UMTS framework of networks.

As known, UMTS characteristics are found in technical specifications defined by the Third Generation Partnership Project (3GPP) standardization body, such as 3GPP TS 23.228 v5.2.0 "IP Multimedia Sub-System Stage 2", TS 23.002 v5.1.0 "Network Architecture (Release 5)", TS 23.060 v4.2.0 "General Packet Radio Service", TR 23.815 v0.1.0 "Charging implications of IMS architecture (Release 5)", TS 32015 v3.6.0 "Charging and billing; 3G call and event data for the packet switched domain (Release 1999)", as well as IETF RFC 2543 "SIP: Session Initiation Protocol" and IETF RFC 2327 "SDP: Session Description Protocol".

The SIP protocol is selected by 3GPP as the only session control protocol for UMTS and it is considered accordingly in this application.

In other NGN networks, other session control protocols may be used for multimedia communications.

The SDP protocol can be used in conjunction with any session control protocol and the present invention is applicable to all types of NGN networks.

A UMTS framework permits multimedia communication sessions between registered subscribers, each session including at least one subscriber as a calling party and at least one subscriber as a called party. The subscribers registered with a telecommunication network operator can obtain different narrow-band and/or multimedia services as proposed by this operator. Choices of services are obtained according to service profiles corresponding to subscription schemes according to which the communication sessions are charged.

As stated above and as pointed out in point 5.2.1.1 of 3GPP TR 23.815 v0.1.0 "Charging implications of IMS architecture" indicated above, charging requires network control elements having CRs providing capabilities. Such control elements are shown on FIG. 1, which relates to a known UMTS R5 IP multimedia subsystem (IMS) architecture.

Such architecture comprises an IP multimedia domain provisioning IP multimedia services.

The UMTS 5 architecture is layered and there is a separation between transport, session/control and service/application network layers. The split into three network layers results in a grouping of network elements of the multimedia architecture into three corresponding domains, a packet switched PS domain, an IP multimedia domain and a services domain. Multimedia services are provided via a packet switched transport network, based on GPRS technology, referenced as reference number 1 on FIG. 1, and a SIP based session control network called the IP multimedia domain. The multimedia architecture is interlinked and interworking with other networks, such as, for instance, the Internet, which is referenced as reference number 2 on FIG. 1, a UMTS terrestrial access network UTRAN, which is referenced as reference number 3 on FIG. 1, a public switched PSTN and/or a integrated services digital network ISDN, both being globally referenced as reference number 4.

The service layer takes care that multimedia services can be provisioned via a service platform 5 that supports different mechanisms such as customized applications for mobile network enhanced logic (CAMEL), or open services architecture (OSA), via SIP application servers or via an Internet-like service provisioning mechanism. The service platform 5 possibly includes different servers as exemplified on FIG. 1 by a SIP application server 6, a OSA server 7, a CAMEL server 8, each of them having CRs generation capabilities. The service platform 5 is connected to SIP servers, such as SIP server 9, via an IMS service control interface ISC, as pointed out by a link on FIG. 1, and it generates CRs in relation with the use of services. The provisioning of multimedia services is controlled by means of a SIP server, such as 9, including means for the generation of charging records CRs related to the services that it provides.

In order to be able to offer IP multimedia services there is a home subscriber server HSS, which is referenced as reference number 10 on FIG. 1, for storing the user's subscription profile data for the different domains.

The session/control layer is based on an initiation protocol/session description protocol SIP/SDP suite that is the single session control protocol suite chosen by 3GPP for the UMTS multimedia domain, SIP messages are used for multimedia session control signaling between end parties. These parties correspond to the calling or called party user equipment or terminal. Within UMTS, they communicate with intermediate SIP call control nodes, such as a serving call state control function S-CSCF or a proxy call state control function P-CSCF. Such control functions correspond to a SIP server, which controls multimedia sessions.

SDP offers the possibility to attach additional information fields to a SIP message and particularly a more detailed session description. SDP is used in association with SIP to negotiate the characteristics of a session and of the multimedia components involved, between session control elements, such as for instance two SIP end users terminals.

According to the invention, SIP/SDP is extended to carry a correlation identifier and a charging information field.

Multimedia services are provided via the packet switched transport network 1.

The transport layer includes media gateways MGW with specific interfaces for taking care of the conversions of data between IP and other media, such as media gateway 11, between IP media and ISDN/PSTN, and media gateway 12, between IP and UTRAN. Such media gateways generate CRs related to the function, which is used, they are each under control of a media gateway controller MGC, such as controller 13 on FIG. 1.

The packet switched PS domain has access core network elements, which generate CRs, such as SGSN support node and GGSN support node, respectively referenced as reference numbers 14, 15 on FIG. 1. So, radio network controllers in UTRAN are linked to elements of the packet switched domain and provide, for instance, packet-switched connectivity services, in relation with Internet application servers 16, 16' to Internet users.

As known, exchanges between network control elements, as stated above, are obtained by means of interfaces that correspond to the links shown between elements on FIG. 1, such interfaces being not described here as they are not necessary to the understanding of the method according to the invention.

The architecture described above is only given as a non-limiting example for a telecommunication system in which the method for charging IP multimedia communication sessions according to the invention is applicable. As also known from the technical specification 3GPP TR 23815 listed above, charging in itself can involve some specific elements that are not shown on FIG. 1 in addition with the network control elements described above. As known, every calling or called party in a communication session needs to be linked to a home or visited network in the telecommunication system for the session, knowing that each party can roam from a network to another during a session, particularly if it uses a mobile as terminal for the session.

Figure 2:
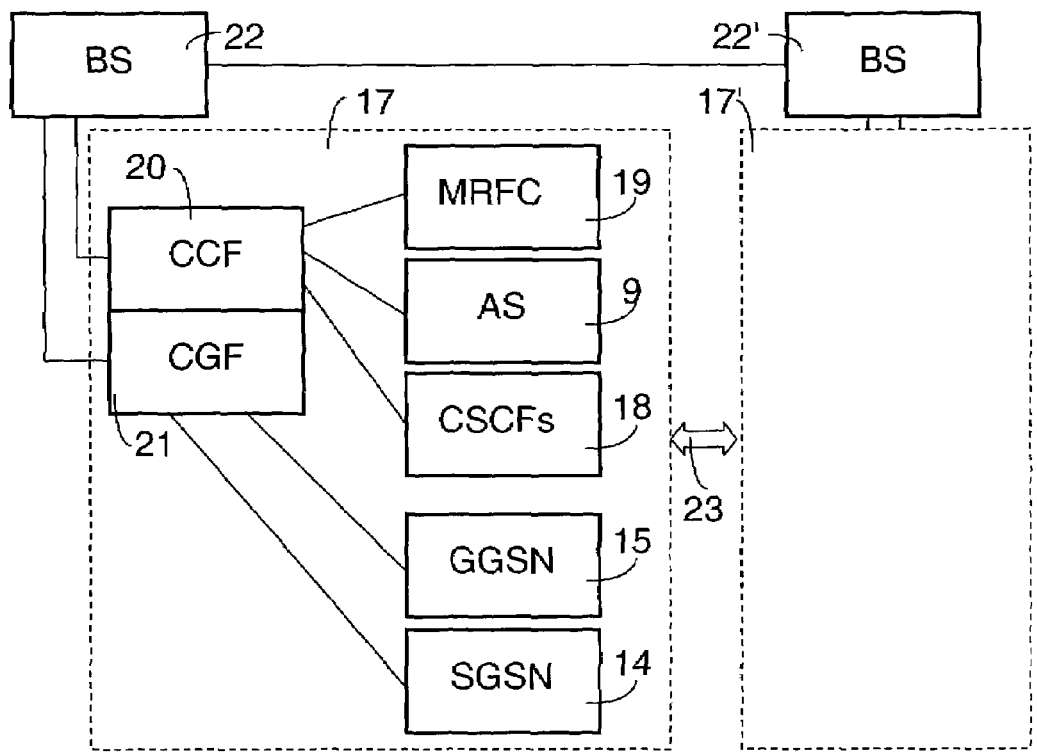
FIG. 2 is a simplified block diagram of an off-line charging architecture for a network.

In the simplified example of a charging architecture given on FIG. 2 for a telecommunication system as foreseen above, as soon as there are at least one calling party and one called party, which are here supposed non-roaming parties, for a multimedia session there are at least one and often two networks involved, such as networks 17 and 17'. As indicated above there are network control elements having CRs generating capabilities, such as SGSN and GGSN support nodes 14, 15, application server 9, call state control functions CSCF here considered as a whole denominated CSCFs and referenced as reference number 18, and of a multimedia resource function controller MRFC 19. Charging and collecting functions such as a charging gateway function CGF 20 and a charging collection function CCF 21 are also included. Charging gateway function 20 collects the CRs from the SGSN and GGSN support nodes 14. It communicates with charging collection function 21, which is collecting CRs from the control elements having CRs generating capabilities in the network as considered, when these elements are involved in a communication session. Both functions communicate with a billing system BS, such as 22 or 22', and with the control elements stated hereabove by means of interfaces that correspond to the links between elements shown on FIG. 2. There are also charging information flows between the networks, such as 17 and 17', for a communication session as symbolized by arrow 23 and more specifically between control element interfaces of both networks. It must be understood that the charging architecture described in relation with FIG. 2 also corresponds to an example and must not be considered as limiting.

As stated above, each charging record CR that is generated in relation with an IP multimedia session, between at least a calling party and at least a called party, includes an identifier ID that is the same for all the CRs generated in relation with this session.

It is assumed here that each CR corresponds to a table including data fields, each corresponding to determined bits of information and each provided with a field name, a description of the field contents and a key. The key, associated to a field, points out if this field is mandatory, optional or available under certain conditions, as indicated in §6 page 24 of the technical specification 3GPP TS 32.015 v3.6.0 release 1999 listed above. A correlation identifier corresponds, for instance, to one of the fields called "charging ID", which is mandatory.

According to the invention, a specific correlation identifier MSCID is initially sent from the side of the calling or first calling party when a session is initiated. This correlation identifier is grouped with selected charging data according to the needs for the session and they are sent to the called party, or to the called parties according to the session that is requested. This transmission is made to and/or by means of each of the control elements already involved in the charging of the session.

According to the invention, at any time during a session, any session control element, network server SIP and/or SIP terminal can create a MSCID and a charging information field CIF. A charging record CR can be created by any control element at any time during a session.

Both SIP clients, by means of SIP user terminals and/or SIP servers can flexibly change the way a multimedia session is charged and communicate the modifications to the charging plan now in force, to the session control elements involved in the session, using the SDP protocol for session capability negotiation.

Generation of a charging record CR by a control element for and during a session is based on the principle indicated above and implies a correlation identifier chosen for the session and charging data corresponding to at least one optional field selected according to the needs.

According to the invention, the SIP/SDP messages are extended to pass a charging information field CIF, specifying the charging plan requested by one session control element, between session control elements. Different events can trigger a session control element to request a change in a charging plan. These events are for instance information received via SDP session capability negotiation, local operator charging policies, service/application settings.

The trigger can correspond, for instance, to information received via SDP session capability negotiation between two parties that are negotiating to set up a voice/video session. The called party would like, for instance, to use a higher quality for the video component than the quality proposed by the calling user in the SDP offer. According to the invention, the called party can indicate in the SDP answer that he, instead of the calling party, agrees to be charged for the video component. He can indicate different amounts of money he is prepared to pay depending on different upgrades to the quality level of the video component that he is prepared to accept.

If, as foreseen above, the Session Initiation Protocol SIP is used it is combined with Session Description Protocol SDP to form an SIP/SDP session control protocol suite.

Figure 3:
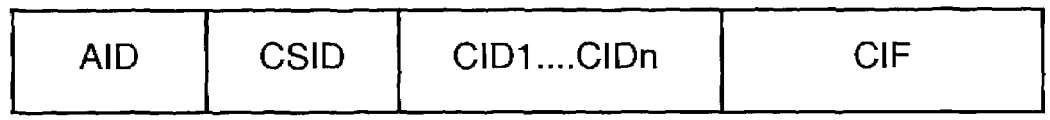
FIG. 3 illustrates the structure of the extensions added to a SIP/SDP message for carrying a correlation identifier and charging plan information according to the invention.

SIP/SDP messages pass between network session control elements involved in a session, such as involved SIP session controllers and end-user terminals. They include a specific field containing a multi-sided correlation identifier MSCID combining an application identifier AID, a communication session identifier CSID, at least one component identifier CID in a list of component identifiers, and also an optional charging information field CIF, as illustrated on FIG. 3. The combination of identifiers is provided in order to facilitate correlation, as for instance, all the CRs having same CSID, same AID can be grouped for charging purposes.

Application identifier AID defines the application involved in a multimedia communication session. Communication session identifier CSI is a session identifier. Component identifier CID corresponds to a list including every component, i.e., IP media flow, which is involved in the session.

The charging information field CIF is used whenever an update to the charging plan is necessary. Changes to the charging plan can be initiated accordingly in any part of a network and at any time during a session, as appropriate charging information can be transmitted to a component by means of a CR with a multi-sided correlation identifier MSCID containing the appropriate identifiers AID, CSID and CID.

Changes to a charging plan can also be specified in a detailed way at the level of a session, a media, a component, via the CIF field. A proper correlation of the concerned CRs in order to reflect a change is obtainable as changes are communicated by means of a multi-sided correlation identifier MSCID. Charging information field contains a list of sub-elements describing the characteristics of the tariff change, e.g., a new charging plan, when this charging needs to be applied. Other characteristics are possible, such as, for instance, an indication of the party or parties involved in a session that will be charged according to the charging applied on this session, when different options are available. The options correspond, for instance to choices according to the session, the media, the component level, the data volumes or else.

Accordingly, any network session control element or terminal has the possibility to flexibly change the way an IP multimedia session is charged, at the initiation of the session or at any time during the session. The charging can be based on different criteria, such, as for instance, information triggers received as a result of SDP negotiation, network charging policy triggers from the network operator involved in the session control, information based on service or application settings, or based upon inter-operator agreements.

As indicated above selected data, related to the charging plan for a session, are passed by means of at least a charging record, together with the determined correlation identifier fixed for this session, between session control elements in a network and/or with control elements in other transport or application network layers performing charging for that session, if any. The same correlation identifier is used by all control elements in all the different network layers for all the charging records produced for a same communication session between at least one calling party and one called party.

The invention claimed is:

1. A method for charging Internet protocol multimedia communication sessions within a telecommunication system, when charging records, related to communication session charging, are generated by at least one control element in the system, with a correlation identifier that is identical for all the charging records produced for a communication session between at least one calling party and one called party, wherein said method comprises:

passing, via a session control protocol, a multi-sided correlation identifier together with a charging information field containing information related to a determined charging plan, for a multimedia communication session involving several control elements, from one of the control elements to another of the control elements, wherein the charging information field is used whenever an update to the determined charging plan is required during the multimedia communication session;

propagating charging plan information, with the multi-sided correlation identifier corresponding to at least a selected set of charging data, between control elements in a network and/or with control elements of other transport or application network layers involved in the multimedia communication session;

including the multi-sided correlation identifier and selected charging data in each charging record generated for the multimedia communication session by each control element which cooperates with the charging of the multimedia communication session, and calculating the charging for the communication session on the basis of the selected charging data received via the charging records including the multi-sided correlation identifier.

2. The charging method according to claim 1, wherein the session control protocol which is used for passing a multi-sided correlation identifier together with a charging information field is the SIP/SDP protocol.

3. The charging method according to claim 1, wherein the multi-sided correlation identifier for a communication session comprises an application identifier related to an application involved in the communication session, a session identifier for the communication session and a component identifier related to a network element involved in the communication session.

4. The charging method according to claim 1, wherein the charging information field specifies a charging plan requested by one control element and sent to the other control elements involved in a session, said charging information field containing a list of sub-elements describing the characteristics of a tariff change to be applied to a session or a part of a session.

5. The method according to claim 4, wherein the charging information field associated with a multi-sided correlation identifier comprises supplementary characteristics corresponding to choices to be made according to the party to be charged, the session, the media, the component level and/or the data volumes.

6. A telecommunication system comprising interlinked networks sharing common rules and a charging arrangement using control elements comprising means for generation of charging records related to IP multimedia communication sessions in which these control elements are involved, wherein the system comprises:

means for passing, by means of a session control protocol, a multi-sided correlation identifier together with a charging information field containing information related to a determined charging plan, for a multimedia communication session involving several control elements, from one of the control elements to another of the control elements, wherein the charging information field is used whenever an update to the determined charging plan is required during the multimedia communication session;

means for propagating charging plan information, with the multi-sided correlation identifier corresponding to at least a selected set of charging data, between control elements in a network and/or with control elements of other transport or application network layers involved in the multimedia communication session;

means for including the multi-sided correlation identifier and selected charging data in each charging record generated for the multimedia communication session by each control element which cooperates with the charging of the multimedia communication session, and means for calculating the charging for the communication session on the basis of the selected charging data received via the charging records including the multi-sided correlation identifier.

7. The telecommunication system according to claim 6, wherein the system comprises network control elements comprising means for acting as network control elements for charging purposes during a multimedia communication session.

8. A plurality of telecommunication network elements for a telecommunication system or a framework of interlinked and interworking networks sharing common rules, and a charging arrangement using control elements comprising means for generation of charging records related to IP multimedia communication sessions, said network comprising multimedia session control elements, each control element comprising at least one of the following means:

means for passing, by means of a session control protocol, a multi-sided correlation identifier together with a charging information field containing information related to a determined charging plan, for a multimedia communication session involving several control elements, from one of the control elements to another of the control elements, wherein the charging information field is used whenever an update to the determined charging plan is required during the multimedia communication session;

means for propagating charging plan information, with the multi-sided correlation identifier corresponding to at least a selected set of charging data, between control elements in a network and/or with control elements of other transport or application network layers involved in the multimedia communication session, and means for including the multi-sided correlation identifier and selected charging data in each charging record generated for the multimedia communication session by each control element which cooperates with the charging of the multimedia communication session.

9. The plurality of telecommunication network elements according to claim 8, wherein at least one control element comprises means for calculating the charging for the communication session on the basis of the selected charging data received via the charging records including the multi-sided correlation identifier.

10. The plurality of telecommunication network elements according to claim 8, wherein at least one control element comprises means for generating a charging information field associated with the multi-sided correlation identifier, said charging information field containing a list of sub-elements describing the characteristics of a tariff change to be applied to a session.

11. The plurality of telecommunication network elements according to claim 8, wherein at least one control element comprises means for adding supplementary characteristics in the charging information field associated with the multi-sided correlation identifier, said supplementary characteristics corresponding to choices to be made according to the party to be charged, the session, the media, the component level and/or the data volumes.

12. The plurality of telecommunication network elements according to claim 8, wherein the network elements are SIP servers and/or SIP user terminals comprising means for acting as SIP/SDP session control protocol engines, with said network SIP servers comprising means for charging multimedia communication sessions.

* * * * *